United States Patent [19]

Boucher

[11] Patent Number: 4,852,251

[45] Date of Patent: Aug. 1, 1989

[54] GRIPPING EYELET DIE TOOL ASSEMBLY

[75] Inventor: Donald A. Boucher, Acushnet, Mass.

[73] Assignee: PCI Group Inc., New Bedford, Mass.

[21] Appl. No.: 202,987

[22] Filed: Jun. 7, 1988

[51] Int. Cl.[4] .......................... H01R 9/20; B23P 19/00; B21D 31/02

[52] U.S. Cl. .......................................... 29/845; 29/747; 29/513; 72/325

[58] Field of Search ................. 29/513, 747, 844, 845; 72/325

[56] References Cited

U.S. PATENT DOCUMENTS 3,020,636 2/1962 Ayton et al. .......................... 72/325

3,106,436 10/1963 Weiss ............................... 29/747 X 3,319,324 5/1967 Keller .............................. 29/513 X

*Primary Examiner*—Howard N. Goldberg

*Assistant Examiner*—Carl J. Arbes

[57] ABSTRACT

A gripping tool assembly for grip securing an eyelet to a printed circuit board. The gripping tool assembly comprises a flat blade in a blade holder. The blade has a rounded distalmost tip with tapered side edges which extend into semi-circular "curling" portions which segments any barrel of an eyelet pressed thereagainst into curled strips. A conically shaped opening in the holder shapes the non-curled portions of the blade inot biased flanges for gripping any wire inserted into the barrel of the eyelet.

17 Claims, 3 Drawing Sheets

GRIPPING EYELET DIE TOOL ASSEMBLY

BACKGROUND OF THE INVENTION (1) Field of the Invention

This invention relates to the connection of electrical components to a printed circuit board, and more particularly to a die tool for configuring ordinary eyelets as gripping eyelets.

(2) Prior Art

Electrical printed circuit board assembly is generally highly automated. The leads of electrical components are automatically inserted into eyelets arranged through one side of a printed circuit board. The distal ends of those leads are clinched on the back or bottom side of the board, which is then wave soldered.

Unattached wires, utilized to connect part of the circuit on the printed circuit board to other boards or components, are another story completely. The stripped ends of the wires have to be inserted into the printed circuit boards by hand, and hand soldered individually, making the operation expensive and time consuming.

Printed circuit board assembly manufacturers will use mylon plugs to insert into eyelets in the printed circuit boards to prevent them from becoming filled with solder during wave soldering and prior to the stripped ends of the unattached leads being mated therewith. The plugs are then removed to reveal an empty ordinary eyelet, into which the unattached lead may be placed and hand soldered.

One concept to this field is shown in U.S. Pat. No. 3,922,057, wherein a terminal is utilized to grip the wire. Unfortunately this terminal does not permit the wire to extend through the board so that it can be soldered from its back or bottom side.

It is an object of the present invention to provide a tool which will permit an ordinary standard eyelet to grip an unattached wire and hold it in place so that the wire and other components already inserted into the printed circuit board may be soldered only once which is during the wave soldering operation.

It is further object of the present invention to provide a tool which will permit small manufacturers who run on low budgets, to utilize standard ordinary eyelets to become gripping eyelets without expensive sophisticated equipment.

BRIEF SUMMARY OF THE INVENTION

In the assembly of an eyelet in a preselected hole in a printed circuit board, a chute of eyelets feeds a tool above the board. The tool also comprises a blade holder which is vertically disposed on a base beneath the board. The holder has a slot across its upper end to securely hold a gripper blade. The gripper blade is held on the holder by a set screw.

A printed circuit board is movably supported on a support table disposed about the gripper blade and holder. A reciprocably movable set cap with a spindle disposed longitudinally therethrough, is arranged above the holder and blade. The eyelets are fed down the chute and mate, serially, with the spindle which directs the eyelet into its proper opening in the printed circuit board.

The set cap advances downwardly against a flanged upwardly directed end of the eyelet, with the barrel of the eyelet directed towards the gripper blade and holder, to force the distal end of the eyelet against the blade, which is supported upwardly into the opening in the printed circuit board and the eyelet.

The blade is generally flat and has an inverted "T" shape having a slightly curved distalmost tip or end, which have cutting edges that extend into the lowermost portion of the blade comprising an arrangement of side arms on opposite sides thereon. A depressed semicircular radius comprises the juncture of the sidearms with the distally directed body of the blade.

When the barrel portion of an eyelet is driven against the blade, the distal end of the blade is caused to be inserted into the barrel of the eyelet. The distal edge of the eyelet strikes the sidearms of the blade, effectively splitting the barrel of the eyelet into segments, creating a strip of barrel material for each sidearm of the blade. The strips are configured so as to curl backwards, towards the bottomside of the printed circuit board which it has just been driven through.

The depressed radius semi-circular juncture between each side arm and the distally directed body of the blade is responsible for effectuating the curl in the strip of material of the eyelet.

The curls press against the bottom of the board to effectuate the holding of the eyelet in the printed circuit board. The spindle and set cap are withdrawn from the eyelet which is now firmly established within the printed circuit board.

The blade holder has the slot which securely receives the blade therein. In the distal end of the blade holder, a conically shaped opening or countersink is disposed, in coaxial alignment with the spindle and the body of the eyelets with which it mates. After the respective side arms of the blade have effectuated their curled segments or strips, the split almost semi-cylindrical distalmost portions of the eyelet are still being driven by the set cap towards the holder, and into the countersink in the holder. The conical shaped receiving walls of the countersink forms the distal ends of the barrel of the eyelet into gripping flanges which are also simultaneously being biased toward one another because the blade is thinner there than at the distal (upper) end of the blade. The flanges are angled with respect to the longitudinal axis of the eyelet, so as to resist any longitudinally directed tension on a wire which is received (and gripped) between the gripping flanges of the eyelet.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENT

Figure 1:
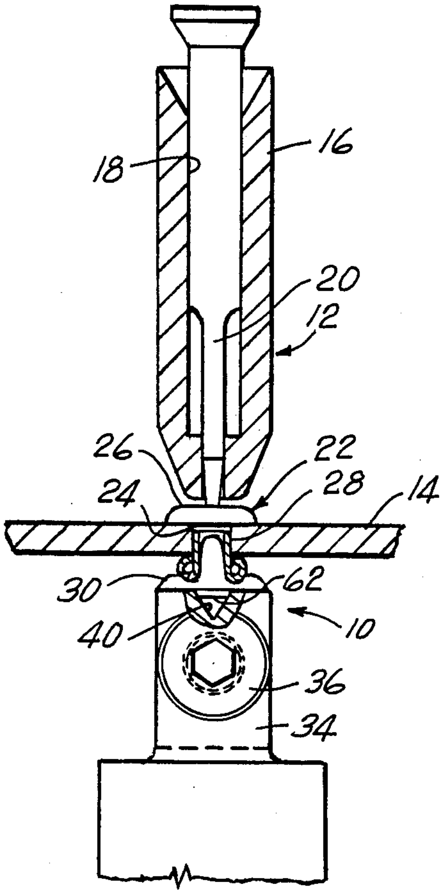
FIG. 1 is a side view of a die assembly constructed according to the principles of the present invention.

Referring now to the drawings in detail, and particularly to FIG. 1, there is shown a dieblade assembly 10 supported beneath a setcap and spindle assembly 12. A receiving element 14, such as a printed circuit board or the like, is shown disposed between the setcap and spindle assembly 12 and the die blade assembly 10.

The spindle assembly 12 comprises a generally tubular set cap 16 having a hollow axial portion 18 through which a spindle 20 is axially displacable. The spindle 20 receives an eyelet 22 from a chute, not shown, which spindle then places the eyelet 22 into an opening 24 in the printed circuit board 14, by known means.

The eyelet 22 is of a typical configuration, having a head portion comprising an annular lip 26, and a body portion called a barrel 28 of generally cylindrical configuration.

The die blade assembly 10 comprises a blade 30 which is fixedly supportable in a slot 32 in the upwardly disposed end of a blade holder 34. A securement means 36 such as a bolt is treadably arrangable through a side portion of the blade holder 34 as shown in FIGS. 1, 2, 3 and as shown in FIG. 4.

Figure 2:
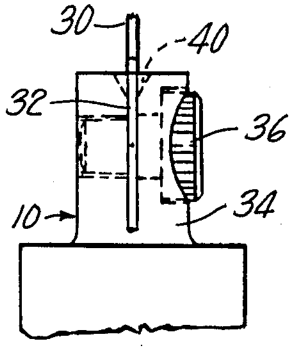
FIG. 2 is a side view of die blade and blade holder.
Figure 3:
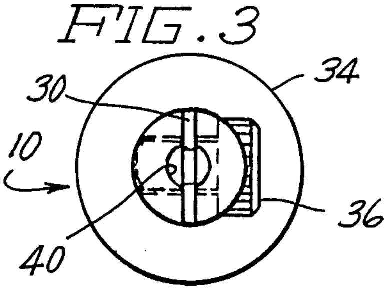
FIG. 3 is a plan view of the die blade an blade holder.

A conically shaped opening 40 is cut in the upper end of the blade holder 34, as shown in FIGS. 1, 2 and 3. The diameter of the opening 40 is at least equal to the outer diameter of the barrel 28 of the eyelet 22. The conical opening 40 has its side tapered at about a sixty degree angle with respect to the longitudinal axis of the blade. The conical opening 40 is centrally disposed in the slot 32, and is arrangable to be in axial alignment with the eyelet 22 and the spindle 20.

Figure 4:
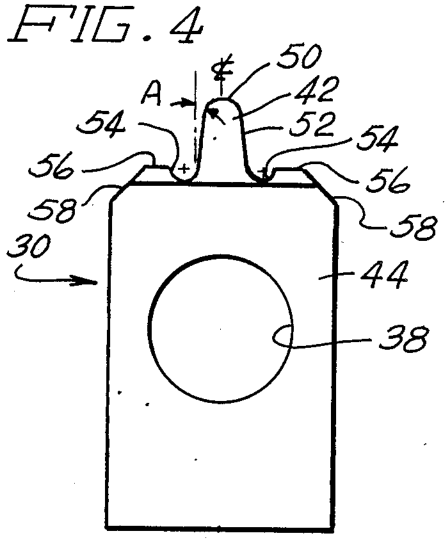
FIG. 4 is an enlarged side view of the die blade.
Figure 5:
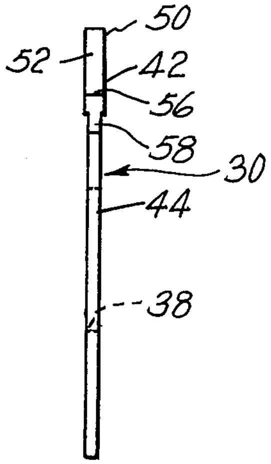
FIG. 5 is an enlarged edge view of the die blade.

The blade 30 is shown enlarged in FIGS. 4 and 5. The blade 30 comprises a thick cutting and forming portion 42 which may for example be about 0.018 in thick and a thinner body portion 44 which may be about 0.014 in thick, as shown in the edge view in FIG. 5. The thicker portion 42 of the blade 30 is disposed above the top surface of the blade holder 34, the thinner portion 44 of the blade 30 being secured in the slot 32. The blade 30 has a rounded tip 50 which comprises a cutting edge, which leads into slightly tapered side cutting edge portions 52, which tapers at an angle A of about six to about nine degrees, preferrably, about seven and one-half degrees, with respect to the longitudinal axis of the blade 30, shown most clearly in FIG. 4. The tapered side portions 52 lead into rounded edge portions 54 which critically are at least semi-circular, that is, at least 180 degrees around their center mark, which rounded edge portions for this example have about a 0.015 inch radius.

The rounded edge portions 54 lead to shoulder portions 56, which each has a bevelled corner 58 extending to the thinner body portion 44. The tapered side portions 52 running into the rounded edge portions 54, which are at least semi-circular, is very important, reasons for which will be described herein below.

In operation of the gripping eyelet tool, the spindle 20 locates the eyelet 22 into the hole 24 in the board 14, which board itself may move on an "X-Y" table, not shown. The set cap 16 presses against the top side or annular lip 26 of the eyelet 22, as the blade holder 34 brings the rounded tip 50 of the blade 30 into mating engagement with the barrel 28 of the eyelet 22. The tapered side portions 52 segments the barrel 28 into a plurality of segmented strips 60, which roll, because of their striking engagement with the rounded "curling" semi-circular edge portions 54 of the blade 30 which makes them curl back and around, putting a resilient pressure against the bottom of the printed circuit board 14, as shown in FIGS. 6, 7 and 10, thus holding the eyelet tightly against the board 14.

The conical shaped opening 40 in the blade holder 34 receives the distalmost end segments of the barrel 28 on each side of the blade 30 as the eyelet 22 is pressed thereon, and as the blade 30 is curling the strips 60. The opening 40 causes a generally cresent shaped flange 62 to form in the edges of the barrel 28 between the curled strips 60.

Figure 6:
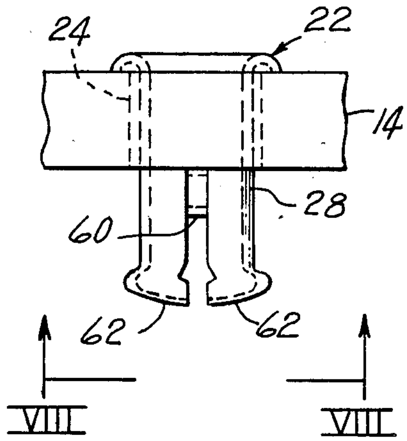
FIG. 6 is an edge view of an eyelet curled into a printed circuit board.
Figure 7:
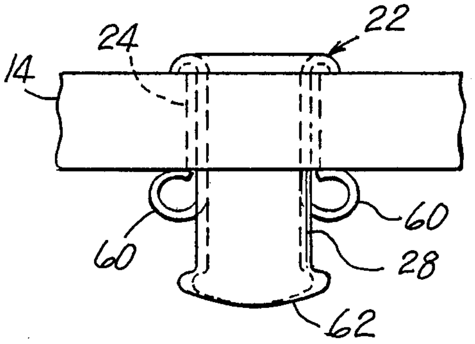
FIG. 7 is a side view of an eyelet curled into a printed circuit board.
Figure 8:
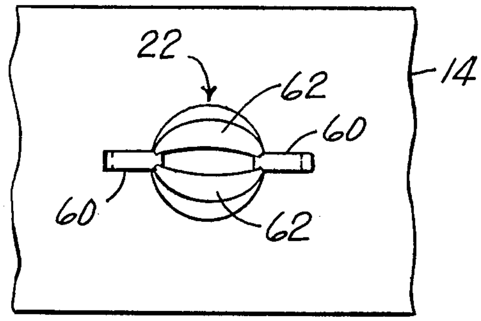
FIG. 8 is a view taken along the lines VIII-VIII of FIG. 6.
Figure 10:
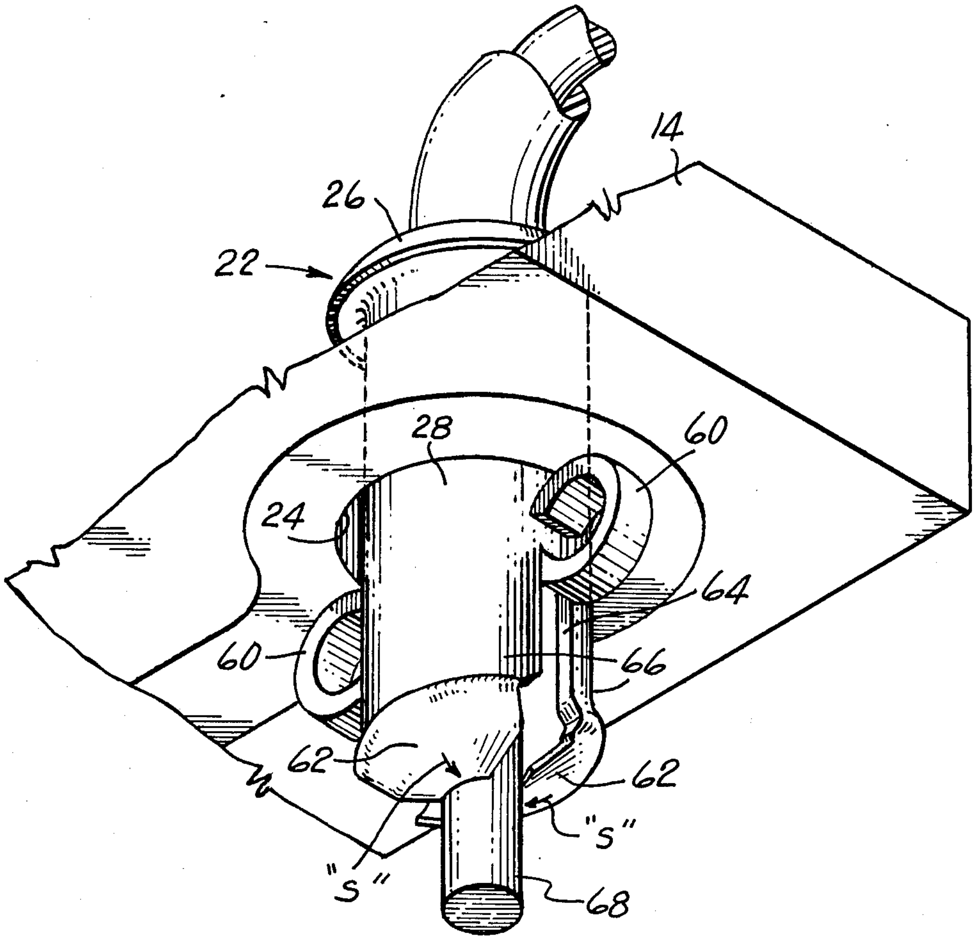
FIG. 10 is a perspective view of an eyelet gripping a printed circuit board looking towards the bottom thereof, with a wire inserted therein.

The curled strips 60 creates a gap 64 between adjacent side portions 66 of the barrel 28 of the eyelet 22, as may be seen in FIGS. 6, 8 and 10. Since the blade 30 is thinner in its body portion 44, which body portion is in the slot 32 of the blade holder 34, and the conical opening 40 is also in the blade holder 34, the side portions 66 of the barrel 28 are pinched closer together as the flanges 62 are formed, thus creating the "bias".

Then when a wire 68, as shown in FIG. 10, is inserted into the eyelet 22 through the opening across the head or annular lip 26 thereof, the flange 62 being biased together somewhat, squeezes the wire 68, as indicated by the arrows "S" in FIG. 10, locking onto it, preventing it from being easily removed therefrom.

Figure 9:
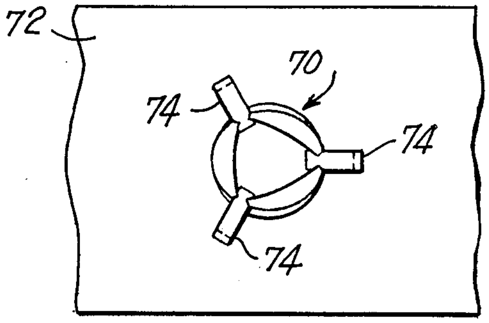
FIG. 9 is a view similar to FIG. 8, with the eyelet pierced with a three edge blade.

An alternative embodiment is indicated in FIG. 9, wherein an eyelet 70 is shown extending through a printed circuit board 72, the eyelet 70 having three curled strips 74. The curled strips 74 are formed from a blade, not shown, which has three tapered side portions which lead into three rounded edge portions of semi-circular configuration similar to the aforementioned embodiment. This would not be made from a flat metallic blade, but made from three sided blade.

Thus there has been shown as eyelet tool which can be utilized with standard machinery to permit attachment of eyelets which will grip electrical components such as unattached wires, for subsequent soldering, doing away with several steps heretofore required during assembly of components on a printed circuit board.

By pressing an eyelet into engagement with a tapered blade having rounded semi-circular side portions to curl segments of the eyelet barrel and simultaneously pressing the non-curled segments of the barrel into a conical opening to put a biased flange onto those non-curled barrel segments and also forcing those flanges together against a thinner portion of the blade than is producing the curls, permits the manufacture of a fast, easy to assemble printed circuit board which will receive unconnected wires and hold them securely until they are soldered with the remaining components on the board.

I claim:

1. The method of "grip attaching" an eyelet into a printed circuit board, comprising the steps of:
   - inserting the barrel of an eyelet into an opening in a printed circuit board;
   - inserting the tip of a cutting and forming blade into the barrel of the eyelet;
   - segmenting at least two portions of the barrel of the eyelet into curled strips which wrap around to press against the printed circuit board; and receiving non-curled portions of the barrel of an eyelet into a conically shaped hole in a holder supporting said blade.

2. The method of "grip attaching" an eyelet to a printed circuit board, as recited in claim 1, also including the step of:

forming a flange on each non-curled portion of the barrel of an eyelet pressed thereagainst.

3. The method of "grip attaching" an eyelet to a printed circuit board as recited in claim 2, including the step of:

squeezing each non-curled flange portion of the barrel of an eyelet pressed into said conical shaped opening towards one another closer together than the thickness of the cutting and forming portions of the blade.

4. The method of "grip attaching" an eyelet to a printed circuit board as recited in claim 3, including the step of:

retracting said blade and blade holder from the barrel of an eyelet formed therewith.

5. A gripping tool assembly for the attachment of a grip eyelet onto a receiving element, said gripping tool assembly comprising:

a spindle and die cap assembly for arranging a grip eyelet in a receiving element;

a die blade assembly arranged in axial alignment with said spindle and die cap assembly including a blade holder having a slot disposed thereacross;

a blade arranged in said slot in said holder;

means on said blade for curling segments of an eyelet pressed thereagainst; and means on said holder to form portions of an eyelet pressed thereagainst, into gripping flanges biased toward one another.

6. A gripping tool assembly as recited in claim 5, wherein said means on said blade for curling segments of an eyelet pressed thereagainst comprises at least one cutting edge which extends into a semi-circular curling edge portion.

7. A gripping tool assembly as recited in claim 6, wherein said means on said holder for forming gripping flanges on an eyelet pressed thereagainst comprises a conically shaped opening disposed contiguous with said slot to press non-curled portions of an eyelet into flange segments.

8. A gripping tool assembly as recited in claim 7, wherein said blade has a cutting and forming portion and a body portion, said body portion being thinner than said cutting and forming portion.

9. A gripping tool assembly as recited in claim 7, wherein said conical opening has side portions arranged at an angle of about sixty degrees with respect to the longitudinal axis of said blade.

10. A gripping tool assembly as recited in claim 8, wherein said blade has a distalmost rounded tip which comprises a cutting edge that enters an eyelet barrel being pressed thereagainst.

11. A gripping tool assembly as recited in claim 8, wherein said blade has a pair of cutting edges, each of which leads from a rounded tip into a semi-circular curling edge portion of said blade.

12. A gripping tool assembly as recited in claim 10, wherein said cutting edge between said rounded tip and said curling edge portion is arranged at an angle of between six degrees and nine degrees with respect to the longitudinal axis of said blade.

13. A blade for cutting and forming a barrel of an eyelet pressed thereagainst, said blade comprising:

a distalmost rounded tip which is in coaxial alignment with the barrel of any eyelet pressed thereagainst;

at least two cutting edges extending from said rounded tip; and a semi-circular curling edge portion connected to said cutting edges for curling segments of the barrel of any eyelet pressed against said rounded tip.

14. A blade as recited in claim 13, wherein said cutting edges disposed between said distalmost rounded tip and said semi-circular curling edge portions are arranged at an angle of about six degrees to about nine degrees with respect to the longitudinal axis of said blade.

15. A blade as recited in claim 14, wherein said blade is flat.

16. A blade as recited in claim 14, wherein said blade has a cutting and forming portion and a body portion, which cutting and forming portion is thicker than said body portion.

17. A blade as recited in claim 16, wherein said body portion of said blade is receivable into a slot in a blade holder, said blade holder having a conically shaped opening for forming non-curled portions of the barrel of an eyelet pressed thereagainst into biased flanges.

* * * * *